(No Model.)
J. BOUDRY.
DOUGH RAISING APPARATUS.
No. 521,972. Patented June 26, 1894.
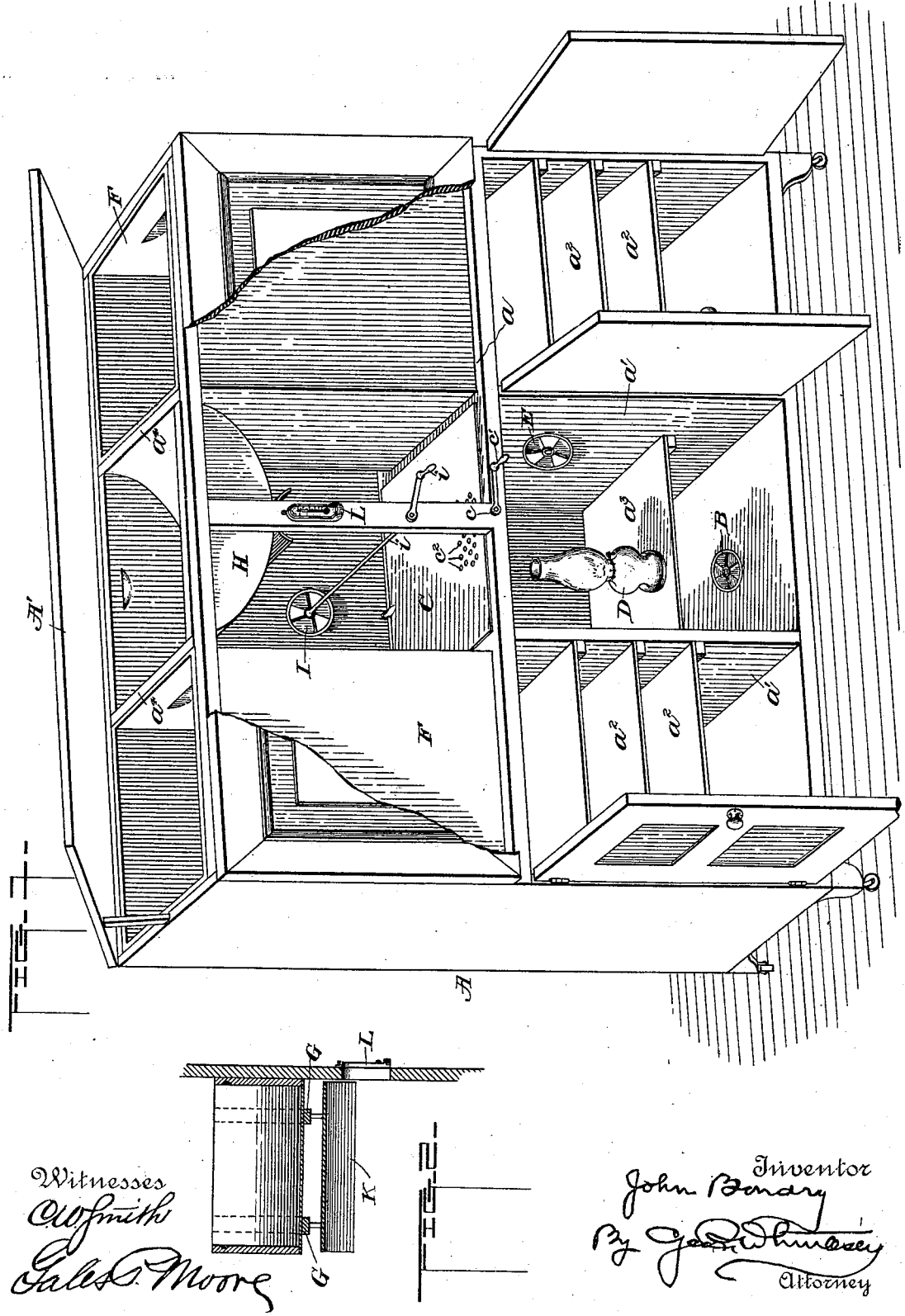
Witnesses
Inventor
John Boudry

UNITED STATES PATENT OFFICE.

JOHN BOUDRY, OF FOND DU LAC, WISCONSIN.

DOUGH-RAISING APPARATUS.

SPECIFICATION forming part of Letters Patent No. 521,972, dated June 26, 1894.

Application filed March 30, 1894. Serial No. 505,735. (No model.)

*To all whom it may concern:*

Be it known that I, JOHN BOUDRY, a citizen of the United States, residing at Fond du Lac, in the county of Fond du Lac and State of Wisconsin, have invented certain new and useful Improvements in Dough-Raising Apparatus; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an apparatus for raising dough, and it consists in certain details of construction hereinafter set forth and particularly pointed out in the claims.

In the drawings, Figure 1 is a perspective view of a cabinet embodying my improvements. Fig. 2 is a detail.

The body A is made of a height convenient to serve as a table, say three feet high. It is preferably about twenty one inches deep, and forty-two inches long. These dimensions may be varied, however, and are given merely to indicate what I consider to be a desirable size. A horizontal partition $a$ divides the interior into upper and lower compartments, the lower being subdivided into three lockers by vertical partitions $a'$. The two side lockers are provided with removable shelves $a^2$ for storing bread, cake, &c., and each locker has its own door as shown. The middle locker is provided in its bottom with a damper B, and its top C is a butterfly valve, fitting an opening in the partition $a$ and hung on a horizontal spindle $c$, which has a handle $c'$ outside of the cabinet. In the valve are a number of small perforations $c^2$. The middle locker contains a shelf or other support $a^3$, for a lamp D or other heater. A damper or register E leads from the middle locker into one of the side lockers. Each end of the upper compartment above the side lockers is occupied by a box or bin F preferably made of metal and loosely set in so that they can be lifted out when necessary. These bins are for flour, meal and the like.

Between the two cross rails $a^4$ hang curved ribs G to support the removable pan H in which the dough is mixed and left to raise. The pan is suspended over the heater, and the heat is regulated not only by the damper B and valve C but also by a damper I in the back of the cabinet above the valve C. A spindle $i$ and a handle $i'$ outside the cabinet give control of this damper. A bell or guard K suspended from the ribs G deflects the rising column of heat and prevents it from unduly heating the lower part of the pan H. A thermometer L is let into a slot in the front of the cabinet, and indicates the temperature of the heating chamber below the pan.

The small perforations $c^2$ prevent the draft from being choked when the valve C is entirely closed, as shown in the drawings.

A lid A' closes the tops of the bin F and the pan H.

Having thus described my invention, what I claim is—

1. A cabinet for mixing and raising dough, comprising a central heating chamber, a pan depending into said chamber, a locker below said chamber, a heater in said locker a butterfly valve between the locker and the heating chamber, and dampers for the entrance and escape of air, substantially as described.

2. A cabinet for mixing and raising dough consisting of the combination with two removable bins, of a pan depending into the space between said bins, a locker below each bin and below the pan, a heater in said latter locker, a damper in the bottom of said locker, another damper in one side thereof, a butterfly valve forming the top of said locker, and a damper in the back of the cabinet below the pan, substantially as described.

3. In a cabinet for mixing and raising dough, the combination with a pan, of a locker below said pan, a heater in said locker, and a butterfly valve containing a number of small perforations, forming the top of said locker, substantially as described.

4. In a cabinet for mixing and raising dough, the combination with the removable bins F, of the curved ribs G in the space between said bins, the pan H supported on said ribs, the deflector K suspended from said ribs, the damper I in the back of the cabinet, the butterfly valve C, the spindles and handles for operating said damper and valve, the side lockers, the middle locker below the valve containing the shelf $a^3$, the heater D supported on said shelf, and the dampers B, E, substantially as described.

In testimony whereof I affix my signature in presence of two witnesses.

JOHN $\overset{\text{his}}{\times}$ BOUDRY.
mark

Witnesses:
 DAVE BOUDRY,
 F. F. DUFFY.